June 26, 1962 C. E. WILLIAMS 3,041,413

ELECTROMAGNETIC TRANSDUCER HEAD

Filed Aug. 29, 1957

Inventor
CECIL E. WILLIAMS

By Hill, Sherman, Meroni, Gross & Simpson Attys

United States Patent Office 3,041,413
Patented June 26, 1962

3,041,413

ELECTROMAGNETIC TRANSDUCER HEAD

Cecil E. Williams, Hawthorne, Calif., assignor to Armour Research Foundation of Illinois Institute of Technology, Chicago, Ill., a corporation of Illinois Filed Aug. 29, 1957, Ser. No. 681,084
3 Claims. (Cl. 179—100.2)

This invention relates to a multi-channel magnetic recording and reproducing head, and particularly to a multiple gap head for use with magnetic tapes having digital signals thereon.

It is an important object of the present invention to provide a novel multiple gap electromagnetic transducer head.

A further object is to provide a multiple gap head having a precise azimuth and special alignment of the respective gaps.

Another object of the invention is to provide a multiple gap playback head capable of providing more precise temporal alignment of playback signals.

Still another object is to provide a novel electromagnetic transducer head especially adapted to the playback of digital signals recorded on adjacent channels of a multiple channel magnetic record tape.

Another and further object of the invention is to provide a multiple channel magnetic recording and reproducing head which is of relatively simple and compact construction and yet which will provide adequate isolation between adjacent gaps.

Other and further important objects, features and advantages of the present invention will be apparent from the following detailed description taken in connection with the accompanying drawings, in which.

As shown on the drawings.

Figures 1, 2, 3, 4:
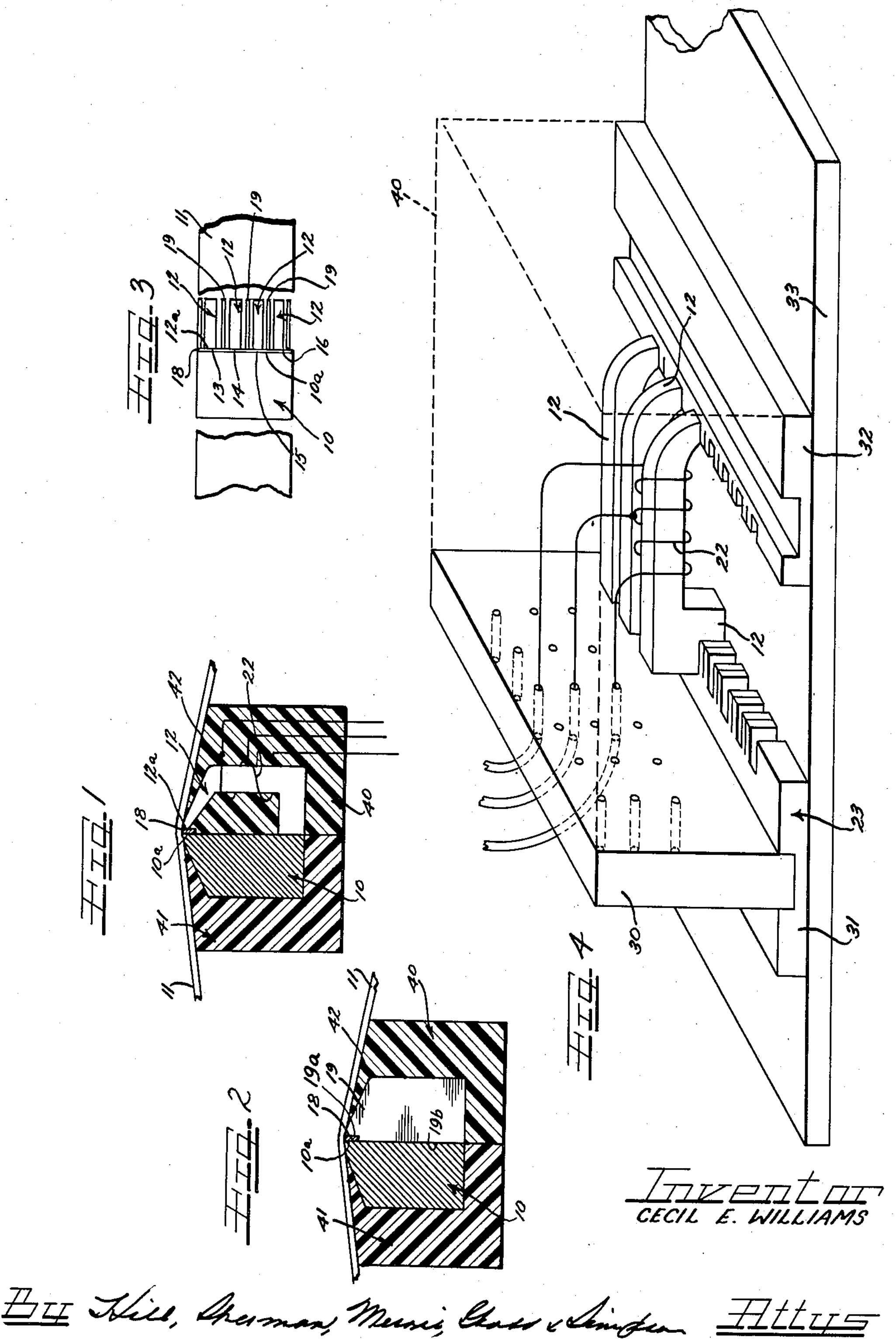
FIGURES 1 and 2 are somewhat diagrammatic vertical sectional views illustrating a multiple gap head in accordance with the present invention cooperating with a magnetic record medium.
FIGURE 3 is a diagrammatic top plan view of the magnetic structure only of the head of FIGURES 1 and 2.
FIGURE 4 is a diagrammatic perspective view illustrating the manner of construction of a head in accordance with the present invention.

Exact azimuth and spacial alignment of the gaps of a multi-channel magnetic transducer head is highly important since it enables records to be played back on heads other than the one used for recording, without loss of signal or the introduction of unequal time delays. Exact temporal alignment of playback signals is particularly desirable when working with tapes having digital signals recorded thereon.

In accordance with the present invention, a common pole member 10 which is generally of the same width as a cooperating multi-channel magnetic record tape 11 cooperates with a series of individual core members 12 to define separate and independent gaps such as indictaed at 13, 14, 15 and 16 in FIGURE 3. Utilization of the common pole member 10 enables one edge of every gap to be in exact azimuth and spacial alignment with the corresponding edge of every other gap in the head. A gap spacer 18 of the desired thickness preferably extends in contact with the tape 11 across the width of the common pole member 10. Crosstalk between channels can be reduced by inserting magnetic shields as indicated at 19 in FIGURES 2 and 3 between the successive core members 12 in spaced relation between the core members but preferably in contact with the common pole member 10 as illustrated in FIGURE 2. As seen in FIGURE 2, the magnetic shields 19 have notches 19*a* receiving the common gap spacer 18 and have edge portions 19*b* below the gap spacer 18 in direct contact with said common pole member 10.

In constructing a head as illustrated in FIGURES 1 to 3, a block of magnetic material is polished flat on one face such as 10*a* in FIGURE 1 and ground to the approximate shape shown in FIGURE 1 to form the common pole member 10. This pole member may be of a high resistivity, such as a ferrite material which is well adapted for use in this type of a head. Conventional "Permalloy 4750," or "Mumetal" may be used but are preferably laminated throughout.

Each of the core members 12 is wound with a coil 22 or coils as desired and these cores are assembled with proper spacing between gaps, for example in a fixture 23 as shown in FIGURE 4. The fixture 23 may comprise a block 30 of "Lucite" material, comb members 31 and 32 of brass and a base plate 33. The core members 12 and shield members 19 may be cast in an epoxy resin as indicated by the dash lines 40 to imbed the core members and shield members in fixed relation. By way of example, the core members 12 as well as the common core member 10 may be of "Ferroxcube 3." The common core member 10 may be cast in an epoxy resin block which is then formed as indicated at 41 in FIGURES 1 and 2.

The core members 12 are now polished flat on a surface 12*a* which is to oppose the surface 10*a* of the common core member 10 to define the gaps 13—16. Similarly, the surface 10*a* of the common pole member 10 is ground flat to the degree of precision required. By optical polishing methods surfaces 10*a* and 12*a* may be made flat within a few millionths of an inch. As illustrated in FIGURE 3, the intersection of the edge of face 10*a* with the active surface of the tape forms one edge of the playback or recording gap for each of the channels on the tape. This insures that all gaps will be in line and have the same azimuth position. The holding compound indicated at 40 in FIGURES 1, 2 and 4 serves the function of maintaining the relative position of the shields 19 and core members 12 and fills any voids between the parts. After the two sections of the head have been cemented together with the gap spacer 18 therebetween, the surface such as 42 which is to contact the tape is ground to the desired shape.

The compositions of the various materials referred to herein may be as follows:

Permalloy 4750—48% nickel, 52% iron.
Mumetal—5% copper, 2% chromium, 77% nickel, 16% iron and impurities.
Ferroxcube 3—manganese, zinc and ferrite.
Lucite—an acrylic resin.

It will be apparent that many modifications and variations may be effected without departing from the scope of the novel concepts of the present invention.

I claim as my invention:

1. A multiple gap magnetic head assembly comprising a common pole member having a straight elongated edge face, a series of core members disposed along said common pole member and having edges disposed in closely spaced relation to respective portions of said common pole member elongated edge face to define a series of spaced non-magnetic gaps, and magnetic shield plates interposed in spaced relation between successive core members tending to isolate the non-magnetic gaps associated therewith, said magnetic shield plates having edges in contact with said common pole member.

2. A multiple gap magnetic head assembly comprising a common pole member having a straight elongated edge face, a series of core members disposed along said common pole member and having edges disposed in closely spaced relation to respective portions of said common pole member elongated edge face to define a series of spaced non-magnetic gaps, magnetic shield plates interposed in spaced relation between successive core members tending to isolate the non-magnetic gaps associated therewith, said magnetic shield plates having edges in contact with said common pole member, and a non-magnetic material embedding said core members and said shield plates.

3. A multiple gap magnetic head assembly comprising a common pole member having a straight elongated edge face, and a series of core members disposed along said common pole member and having edges disposed in closely spaced relation to respective portions of said common pole member elongated edge face, a common gap spacer extending continuously along said straight elongated edge face of said common pole member between said straight elongated edge face and the edges of said core members to define a series of spaced non-magnetic gaps, and magnetic shield members interposed between successive core members tending to isolate the non-magnetic gaps associated therewith, said magnetic shield members each being notched adjacent said common gap spacer and having an edge portion thereof below the gap spacer in direct contact with said common pole member.

References Cited in the file of this patent

UNITED STATES PATENTS

| | | |
|---|---|---|
| 2,732,275 | MacNeill | Jan. 24, 1956 |
| 2,756,280 | Rettinger | July 24, 1956 |
| 2,769,866 | Kornei | Nov. 6, 1956 |
| 2,785,038 | Ferber | Mar. 12, 1957 |
| 2,839,614 | Merrill | June 17, 1958 |
| 2,848,556 | Roys et al. | Aug. 19, 1958 |
| 2,922,231 | Witt et al. | Jan. 26, 1960 |
| 2,928,907 | Lubkin | Mar. 15, 1960 |